United States Patent
Dürr

(10) Patent No.: US 12,179,344 B2
(45) Date of Patent: Dec. 31, 2024

(54) ROBOT ARM HAVING AN ARTICULATED JOINT

(71) Applicant: AGILE ROBOTS SE, Munich (DE)

(72) Inventor: Daniel Mark Dürr, Munich (DE)

(73) Assignee: Agile Robots SE, Munich (DE)

( * ) Notice: Subject to any disclaimer, the term of this patent is extended or adjusted under 35 U.S.C. 154(b) by 0 days.

(21) Appl. No.: 17/767,645

(22) PCT Filed: Apr. 9, 2020

(86) PCT No.: PCT/EP2020/060200
§ 371 (c)(1),
(2) Date: Apr. 8, 2022

(87) PCT Pub. No.: WO2021/204393
PCT Pub. Date: Oct. 14, 2021

(65) Prior Publication Data
US 2024/0083044 A1 Mar. 14, 2024

(51) Int. Cl.
*B25J 9/00* (2006.01)
*B25J 18/00* (2006.01)

(52) U.S. Cl.
CPC ............. *B25J 18/00* (2013.01); *B25J 9/0009* (2013.01)

(58) Field of Classification Search
CPC ...... B25J 17/00; B25J 17/0241; B25J 9/0009; B25J 18/00
(Continued)

(56) References Cited

U.S. PATENT DOCUMENTS

| 5,732,599 A | 3/1998 | Iriyama |
| 2003/0172536 A1 | 9/2003 | Raab et al. |

FOREIGN PATENT DOCUMENTS

| CN | 109551481 A | * | 4/2019 | .......... B25J 17/0241 |
| CN | 110561493 A | | 12/2019 | |

(Continued)

OTHER PUBLICATIONS

International Search Report for application No. PCT /EP2020/060200 dated Jan. 12, 2021.

*Primary Examiner* — T. Scott Fix
(74) *Attorney, Agent, or Firm* — Carter, DeLuca & Farrell LLP

(57) ABSTRACT

The invention relates to a robot arm having at least two limbs (2), which are connected to one another at their ends via an articulated joint (10) so that they can be pivoted relative to one another about a rotation axis (A), the two limbs (2) each comprising at least one joint portion (3) and a transition region (4) adjoined thereto and each extending in a longitudinal direction (L). According to the invention, the transition region (4) of at least one of the limbs (2, 2a) has a circumferential edge (6) which, when viewed from a direction running transverse to the rotation axis (A) and transverse to the longitudinal direction (L), crosses a parting line (9) between the two joint portions (3) and runs at a predefined distance radially outside the joint portion (3) of the other limb (2), the circumferential edge (6) running at a distance, in relation to the rotation axis (A), of less than 25 mm outside the surface of the joint portion (3) of the other limb (2) arranged beneath. In addition, a portion of the circumferential edge (6) extends obliquely to the rotation axis (A) when viewed from a direction running transverse to the rotation axis (A) and transverse to the longitudinal direction (L).

10 Claims, 6 Drawing Sheets

(58) Field of Classification Search
USPC .................................................... 74/490.01
See application file for complete search history.

(56) References Cited

FOREIGN PATENT DOCUMENTS

| | | |
|---|---|---|
| DE | 10 2015 012 959 A1 | 4/2017 |
| DE | 10 2018 213 499 A1 | 2/2020 |

* cited by examiner

ROBOT ARM HAVING AN ARTICULATED JOINT

The invention relates to a robot arm having at least two limbs, which are connected to one another via a joint so that the arms can bend.

TECHNICAL BACKGROUND

Industrial robots (also: industrial manipulators) are universal, programmable machines for handling, assembling or processing workpieces or objects. Such robots come in a wide variety of designs. Single-arm robots are known, for example, from DE 10 2015 012 959 A1 or DE 10 2018 213 499 A1. The robots shown there have a plurality of limbs that are connected to one another via articulated and rolling joints. The articulated joints allow a pivoting movement here of the associated limbs about a rotation axis and the rolling joints allow a rotational movement of the associated limbs about a longitudinal axis.

A disadvantage of many known robot designs is that the distance between the rolling joint and the associated articulated joint of a limb is relatively large. This has a detrimental effect on the performance and agility of the robots. Shortening the distance between the rolling joint and the articulated joint would also make it possible to shorten the overall length of the robot and thus increase the overall rigidity.

Other robot designs achieve a smaller distance between the rolling joint and the articulated joint by adding the region of the rolling joint directly to the region of the articulated joint. However, this creates an area with a small material cross-section, which affects the rigidity and strength of the robot arm.

It is therefore the object of the present invention to provide a compact, stable and agile robot having a robot arm comprising a plurality of limbs interconnected by articulated and rolling joints.

This object is achieved in accordance with the invention by the features described in claim 1. Further embodiments of the invention result from the dependent claims.

SUBJECT OF THE INVENTION

A robot arm is proposed, having at least two limbs, which are connected to one another via an articulated joint so that they can be pivoted relative to one another about a common rotation axis. The limbs each comprise, at one end, a joint portion which receives part of the articulated joint and which is adjoined by a curved transition region, which in turn opens into a leg portion. The limbs further extend in a longitudinal direction that is transverse to the rotation axis and corresponds to the main extension direction of the robot arm when the robot arm is fully extended. At least one of the two limbs comprises a transition region having a peripheral edge which extends from the joint portion of the limb towards the joint portion of the other limb and, when viewed from a direction running transverse to the rotation axis and transverse to the longitudinal direction, crosses a parting line present between the two joint portions. The peripheral edge is arranged at a radial distance of less than 25 mm outside the surface of the underlying joint portion of the other limb with respect to the rotation axis. The transition region of one limb thus hovers at a very small distance above the joint portion of the other limb. In addition, the peripheral edge on at least one side of the articulated joint, when viewed from the aforementioned direction, extends obliquely to the rotation axis. A robot arm constructed in this way is particularly compact and offers high performance.

In other words, the following applies to the course of the peripheral edge: If the articulated joint is viewed from a direction that is transverse to the rotation axis and transverse to the longitudinal direction of the associated limb, the peripheral edge extends spatially in front of and/or behind the articulated joint along at least one portion. The point at which it crosses the parting line between the two joint portions is thus in front of or behind the articulated joint when viewed from this direction. From this point, the peripheral edge then runs obliquely upwards or downwards (if the rotation axis is arranged horizontally) spatially in front of the articulated joint until it crosses the upper/lower edge of the projection surface of the other joint portion of the articulated joint and runs radially outside, i.e. above or below, the other joint portion.

The peripheral edge of one limb, along its course, preferably has a substantially constant radial distance from the surface of the joint portion of the other limb.

According to a preferred embodiment of the invention, the distance between the peripheral edge of one limb and the surface of the joint portion of the other, underlying limb or radially inwardly is less than 10 mm and in particular about 1 mm to 5 mm.

An "articulated portion" shall be understood to mean in particular a portion of a limb which forms part of the articulated joint and receives therein, for example, part of an electromotive drive. An articulated joint is preferably formed from two adjacent joint portions of two limbs receiving the joint mechanism therein.

According to one embodiment of the invention, the peripheral edge, when viewed from a direction transverse to the rotation axis and transverse to the longitudinal direction, extends at least in the region of the parting line at an angle between 1° and 70° or 10° and 50° and preferably about 15° and 30° relative to the rotation axis.

According to the invention, the peripheral edge of the transition region defines a bottom surface that is V-shaped or parabolic when viewed from above and has two legs that run obliquely or converge with respect to the rotation axis. The two legs can be symmetrical with respect to the vertex of the curve, but they can also be asymmetrical. The top view is a view from a direction in which the bottom surface shows the greatest extension. It should be noted that the ground surface does not have to be physically present, but can be a virtual surface that is spanned by the peripheral edge.

According to a preferred embodiment of the invention, the legs of the peripheral edge (considered in plan view) run at least in the region of the parting line at an angle between 0° and 30° or 10° to 30° and preferably about 15° to 25° relative to the rotation axis. The angle between the peripheral edge and the rotation axis at the location of the parting line is preferably about 15° to 25°.

The bottom surface of the transition region of one limb and the surface of the joint portion of the other, underlying limb or radially inside are preferably parallel surfaces. During a bending movement of the robot arm, the radial distance between the bottom surface of one limb and the underlying joint portion of the other limb preferably remains constant.

The second limb of an articulated joint is preferably formed in the same manner as the first limb and accordingly has a transition region which extends from its joint portion in the direction of the joint portion of the first limb, crosses a parting line present between the two joint portions and then runs at a predetermined radial distance above the first joint portion. According to one embodiment of the invention, the transition region of the second limb has a peripheral edge which is arranged at a radial distance of less than 25 mm above the surface of the joint portion of the first limb with respect to the rotation axis. The transition region of the second limb thus hovers at a very small distance above the joint portion of the first limb. Furthermore, when viewed from a direction transverse to the rotation axis and transverse to the rolling axis, the peripheral edge extends obliquely to the rotation axis at least on one side of the articulated joint.

The articulated joint is preferably designed in such a way that the parting line between the two limbs is substantially in the middle of the joint. However, the parting line could also be laterally offset from the centre. The parting line is preferably in a plane that extends transversely to the rotation axis.

According to one embodiment of the invention, the peripheral edge of the transition region of the first or second limb runs across the parting line and continues as an edge in the region of the joint portion of the same limb. The course of the edge is substantially continuous here, i.e. there is no step or only a step of a few mm, in particular less than 5 mm.

The limbs of the robot arm are preferably configured such that a portion of the peripheral edge of the first limb and an adjacent portion of the peripheral edge of the second limb, which together form a joint, run substantially in parallel when the robot arm is in a particular position. The parallel arrangement of the adjacent portions or edges is preferably given in a position of the articulated joint in which the joint is at an end stop and the adjacent portions or edges are closest together.

According to a particular embodiment of the invention, the transition regions of the two limbs are shaped in such a way that a distance between the transition regions measured in the region of adjacent peripheral edges in the peripheral direction (with respect to the rotation axis) increases with increasing distance from the rotation axis. This prevents a user's fingers from being pinched when the limbs are angled to the maximum.

The transition regions of the two limbs of a joint are preferably shaped in the region of their peripheral edges in such a way that a V-shaped free space remains between the transition regions when the limbs are angled to the maximum. The V-shaped free space is preferably dimensioned in such a way that a user's fingers cannot become pinched between two limbs.

BRIEF DESCRIPTION OF THE DRAWINGS

The invention is explained in more detail below by way of example with reference to the accompanying drawings, in which.

EMBODIMENTS OF THE INVENTION

Figure 1:
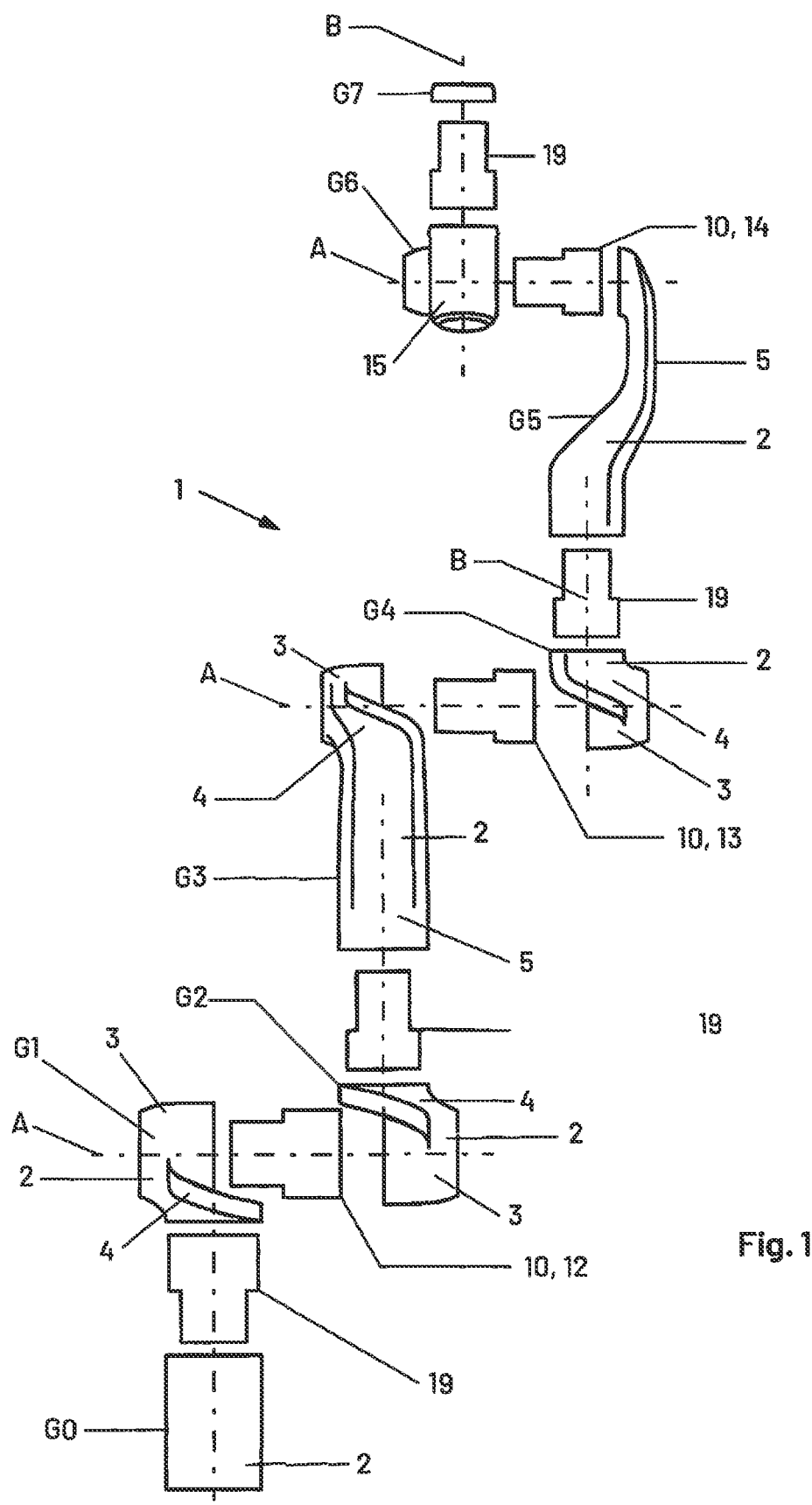
FIG. 1 shows an exploded view of a robot arm with a plurality of limbs connected to one another via articulated joints and rolling joints.

FIG. 1 shows an exploded view of a robot arm 1 with a plurality of limbs 2 connected to one another via a plurality of articulated joints 10 and rolling joints 19. The articulated joints 10 each allow a pivoting movement of the associated limbs 2 about a rotation axis A, and the rolling joints 19 each allow a rotational movement of the associated limbs 2 about a rotation axis B.

In this exemplary embodiment, the robot arm 1 comprises exactly eight limbs, namely, from bottom to top, a limb G0, which is connected via a rolling joint 19 to a limb G1. The latter is pivotably connected to a limb G2 via an articulated joint 10. At the upper end of the limb G2, a rolling joint 19 is again provided, which connects the limb G2 to a subsequent limb G3. The latter is connected to a further limb G4 via an articulated joint 10. The limb G4 is connected to a limb G5 via a rolling joint 19, and the limb G5 is connected to a further limb G6 via an articulated joint 10. Lastly, the limb G6 is connected to a limb G7 via a rolling joint 19.

In the design of the robot arm 1 shown here, the articulated joints 10 and rolling joints 19 are arranged one above the other. The rotation axes A of the articulated joints 10 and the rotation axes B of the rolling joints 19 are also perpendicular to one another.

The limbs G1-G6 each comprise a joint portion 3, which receives a part of the associated articulated joint 10 therein, a transition region 4 and a leg portion 5, which receives a part of the associated rolling joint 19. Each articulated joint 10 comprises two joint portions 3 of adjacent limbs 2 arranged side by side in the direction of the rotation axis A. Between the two joint portions 3 of an articulated joint 10 there is a parting line 9, which is arranged centrally here. However, it could also be arranged laterally offset from the centre.

Figure 2A:
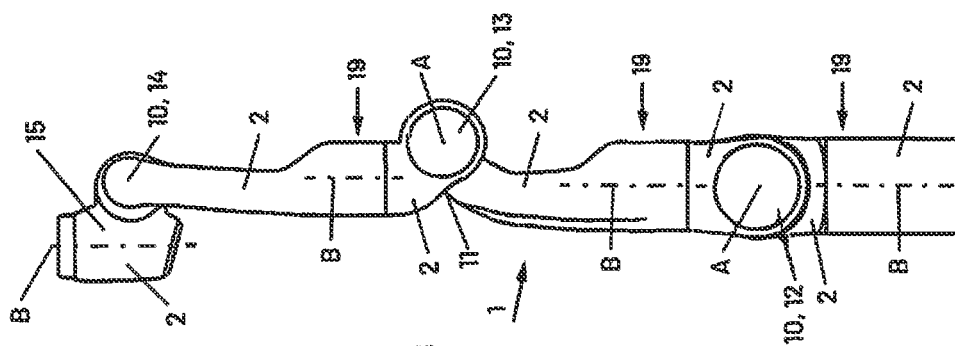
FIG. 2a-d show different views of the robot arm of FIG. 1 in a fully stretched state.
Figure 2B:
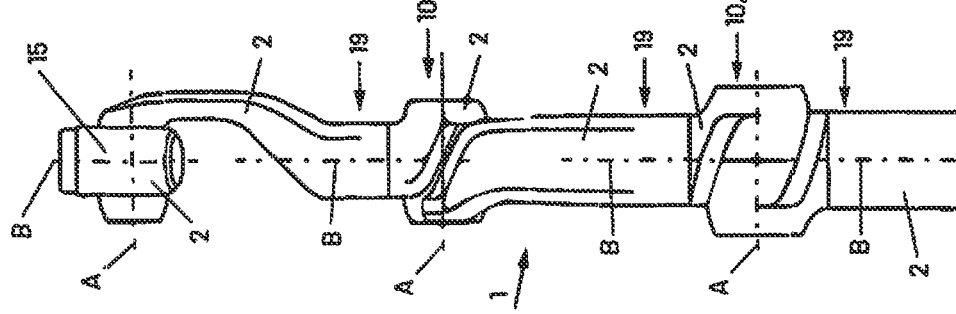
Figure 2C:
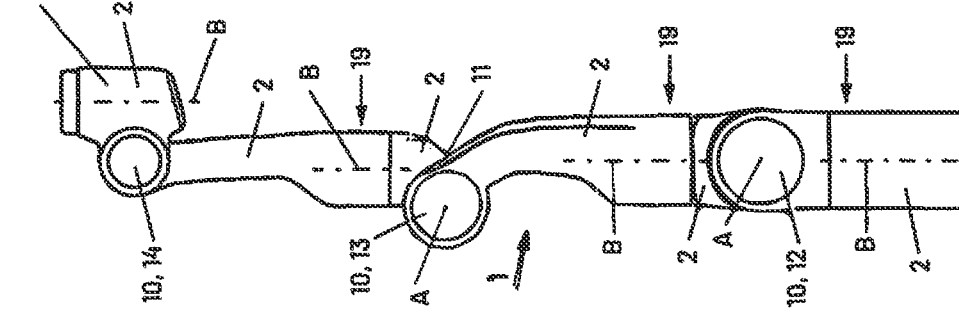
Figure 2D:
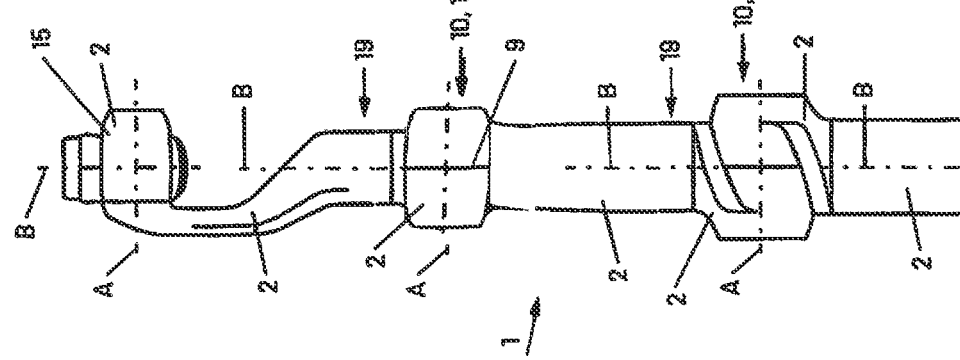

FIGS. 2a-2d show different views of the robot arm 1 of FIG. 1 in a fully extended state. Here, FIG. 2a is a view from the front, FIG. 2b is a view from the left, FIG. 2c is a view from behind and FIG. 2d is a view from the right. In the fully extended state of the robot arm 1, as shown, the longitudinal direction L of the individual limbs 2 corresponds to the main extension direction of the robot arm 1.

The robot arm 1 shown here is based on the physiognomy of a human arm. The articulated joints 10 can therefore also be referred to as a shoulder joint 12, elbow joint 13 and wrist joint 14. The limb G6 is the robot head 15, to which, depending on the particular application, for example a tool or a sensor is attached, with which a desired activity can be carried out.

As can be seen in FIGS. 2a-2d, the shoulder joint 12 and the elbow joint 13 in particular have a very compact and stable construction. The design principles of these articulated joints 12, 13 are explained in more detail below with reference to FIG. 3.

Figure 3:
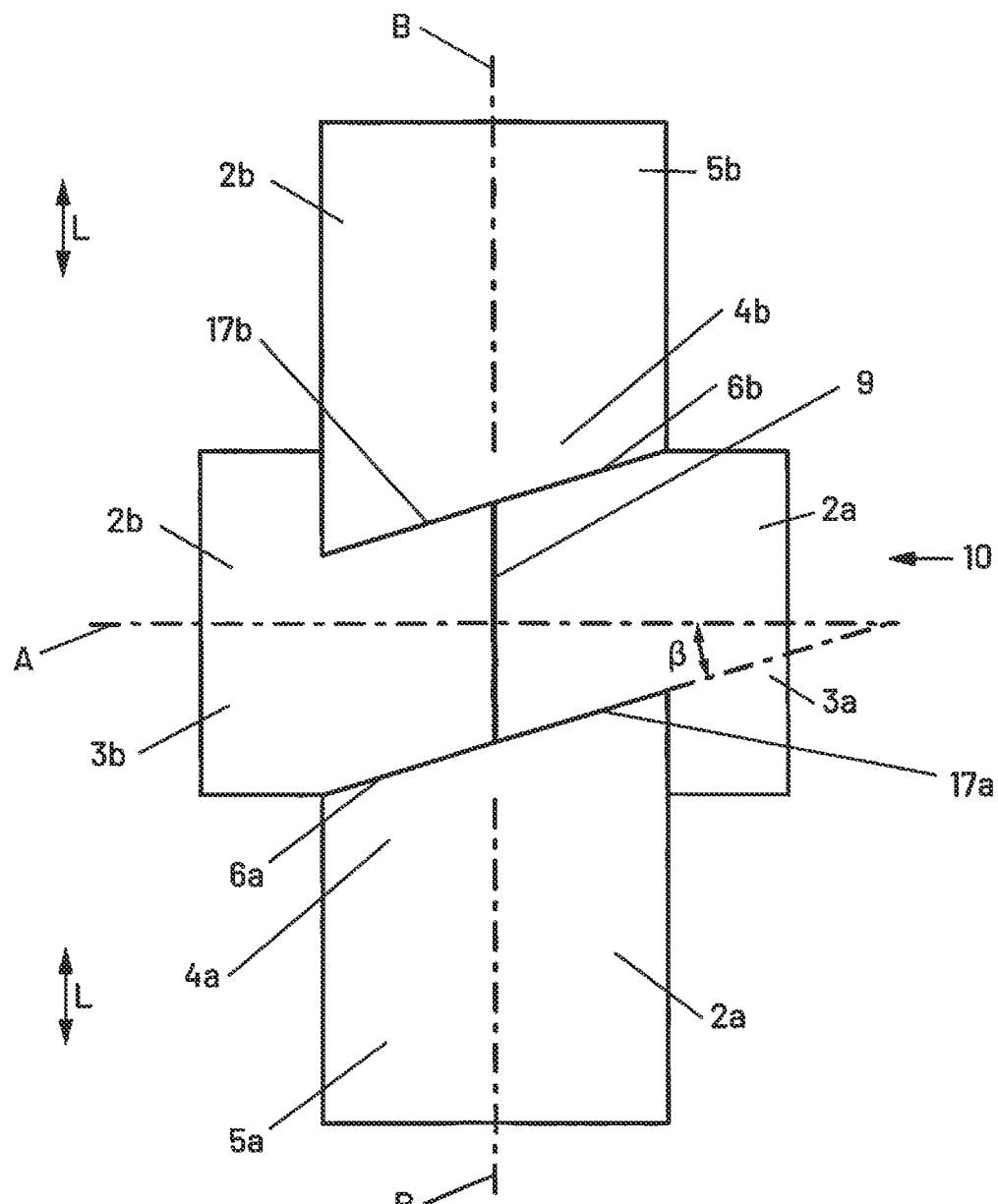
FIG. 3 shows a schematic representation of an articulated joint, which serves to explain the basic principles of the present invention.

FIG. 3 shows a schematic view of an articulated joint 10 pivotably connecting two limbs 2a and 2b. The limbs 2a, 2b each comprise a joint portion 3a, 3b, which accommodates part of the articulation mechanism of the articulated joint 10, as well as a transition region 4a, 4b, which projects beyond the joint portion 3a, 3b of the other limb 2a, 2b. At their free ends (top and bottom in the picture), the limbs 2a, 2b are each connected to a subsequent limb 2 (not shown) via a rolling joint 19.

As can be seen in FIG. 3, the transition region 4b of the upper limb 2b extends from the joint portion 3b to the right in the direction of the joint portion 3a of the other limb 2a, crosses a parting line 9 in the direction of the rotation axis A and then runs at a predetermined distance just above the joint portion 3a of the limb 2a. The same applies also to the transition region 4a of the other limb 2a, only in the opposite direction. The leg portions of the two limbs 2a, 2b are marked with the reference sign 5. In the state shown, the limbs 2 each extend in a longitudinal direction L, which is transverse to the rotation axis A. The longitudinal direction L and the rolling axis B point in the same direction.

The transition region 4a, b of the two limbs 2a, 2b has in each case, on its side facing the rotation axis A, a peripheral edge 6 which extends at a small radial distance of less than 10 mm, preferably about 1-4 mm above the surface of the underlying joint portion 3a, 3b of the other limb 2a. In other words, the transition region 4a, 4b of the limbs 2a, 2b protrudes above the joint portion 3a, 3b of the other limb 2a, 2b and hovers a small distance thereabove.

If the peripheral edges 6a, 6b are viewed, as here, from a direction that is transverse to the rotation axis A and transverse to the longitudinal direction L or rolling axis B, the peripheral edge 6a, 6b in question extends obliquely to the rotation axis A. This has the advantage that the robot arm 1 is particularly compact and has a high rigidity. The peripheral edges 6a, 6b can, for example, assume an angle β of between 1° and 70°, preferably 15° and 30°, relative to the rotation axis A.

In the schematic sketch shown, the peripheral edges 6a, 6b are drawn in simplified form as straight lines. In reality they can also be curved. The angle β defined above between a peripheral edge 6a, 6b and the rotation axis A should therefore be present at least at one point of the peripheral edge 6a, 6b, in particular at the parting line 9.

In FIG. 3 it can also be seen that the peripheral edges 6a, 6b of the transition regions 4a, 4b each continue in the region of the joint portion 3a, 3b of the same limb 2a, 2b as a housing edge 17a, 17b. The course of the edges 6, 17 is substantially continuous, i.e. there is no step in the course, or only a minimum step of a few mm, in particular about 1 mm to 4 mm.

The limbs 2a, 2b are further configured in the region of the articulated joint 10 such that a portion of the peripheral edge 6a of the limb 2a and a portion of the housing edge 17b of the other limb 2b are substantially parallel when the articulated joint 10 is in an end position.

Instead of both limbs 2a, 2b, only one of the limbs 2a, 2b could have a transition region 4a, 4b with an oblique peripheral edge 6a, 6b. The limbs 2a, 2b can be symmetrical on the other side of the rotation axis A (that is to say, viewed from behind in the picture). Alternatively, only one of the limbs 2a, 2b can be symmetrical.

Figure 4:
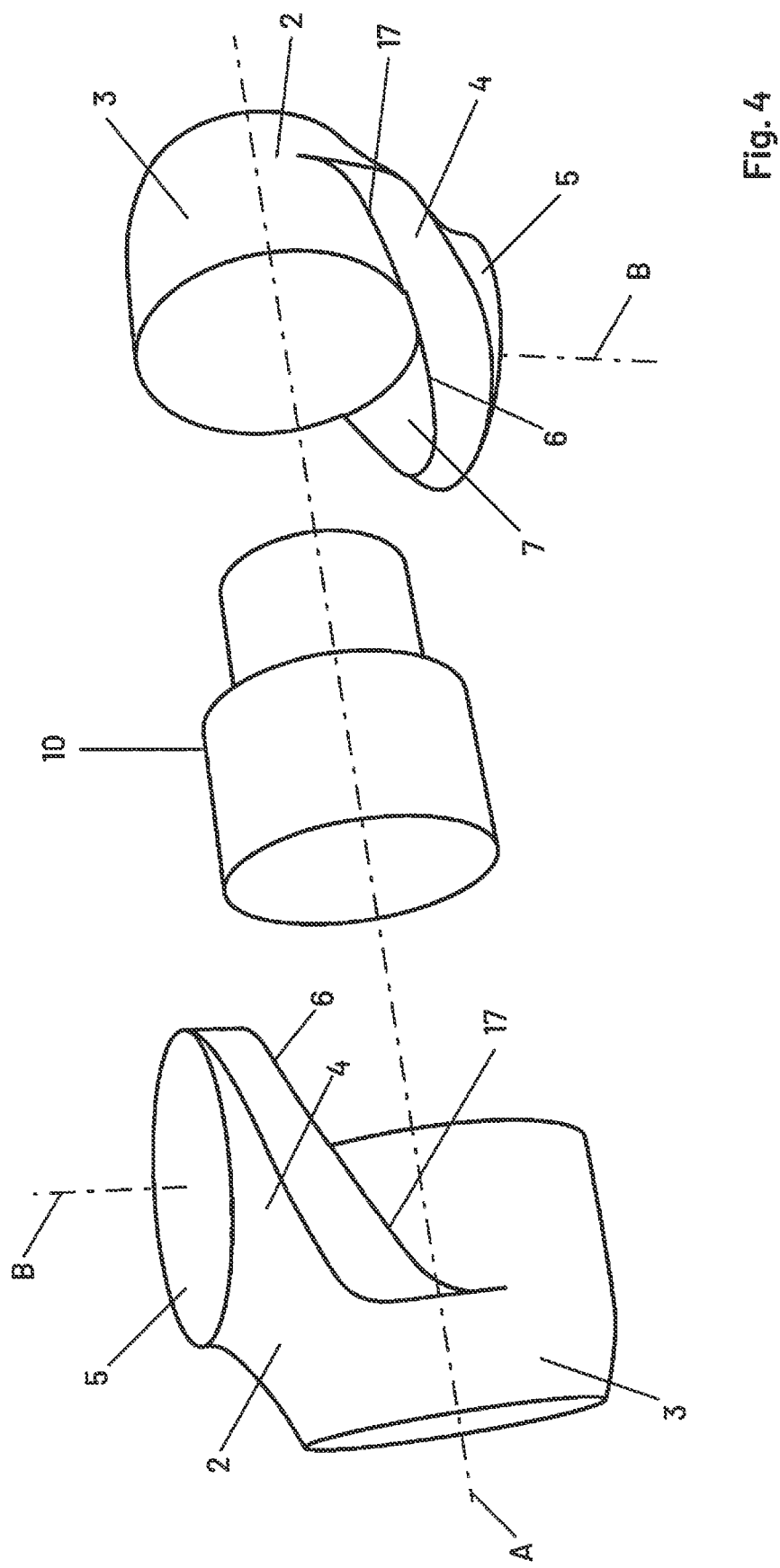
FIG. 4 shows an exploded view of an articulated joint of the robot arm of FIG. 1.

FIG. 4 shows two limbs 2 embodied according to the aforementioned principles, which are pivotably connected to one another via an articulated joint 1. In particular, the peripheral edge 6 of the transition region 4 is clearly visible on the limb 2 shown on the right in the picture. The transition region 4 also has a bottom surface 7 which, viewed in the direction of the rolling axis, is V-shaped or parabolic and has two legs which run obliquely or converge with respect to the rotation axis A.

The bottom surface 7 of one limb 2 and the surface therebeneath of the articulated portion 3 of the other limb 2 are preferably parallel surfaces. The surface of a joint portion 3 can be cylindrical or cylindrically barrel-shaped or -bellied, for example, as shown.

In FIG. 4 it can also be clearly seen how the peripheral edges 6 of the transition regions 4 each continue in the region of the joint portion 3 of the same limb 2 as an edge 17. The course of the edges 6, 17 is substantially continuous here.

Looking at FIG. 2c, it can also be seen that the transition regions 4 of the two limbs 2b, 2c are shaped in such a way that a distance between the transition regions 4 measured in the region of adjacent peripheral edges 6 in the peripheral direction (with respect to the rotation axis A) increases as the distance from the rotation axis A increases. The transition regions 4 of the adjacent limbs 2b, 2c are shaped here in such a way that a V-shaped free space 11 remains between the transition regions 4 in the region of adjacent peripheral edges 6 when the limbs 2b, 2c are angled to the maximum. This free space 11 prevents a user's fingers from being pinched when the joint 10 moves to an end position. The free space 11 is preferably provided on both sides of the joint 10 in the same or similar manner.

Figure 5:
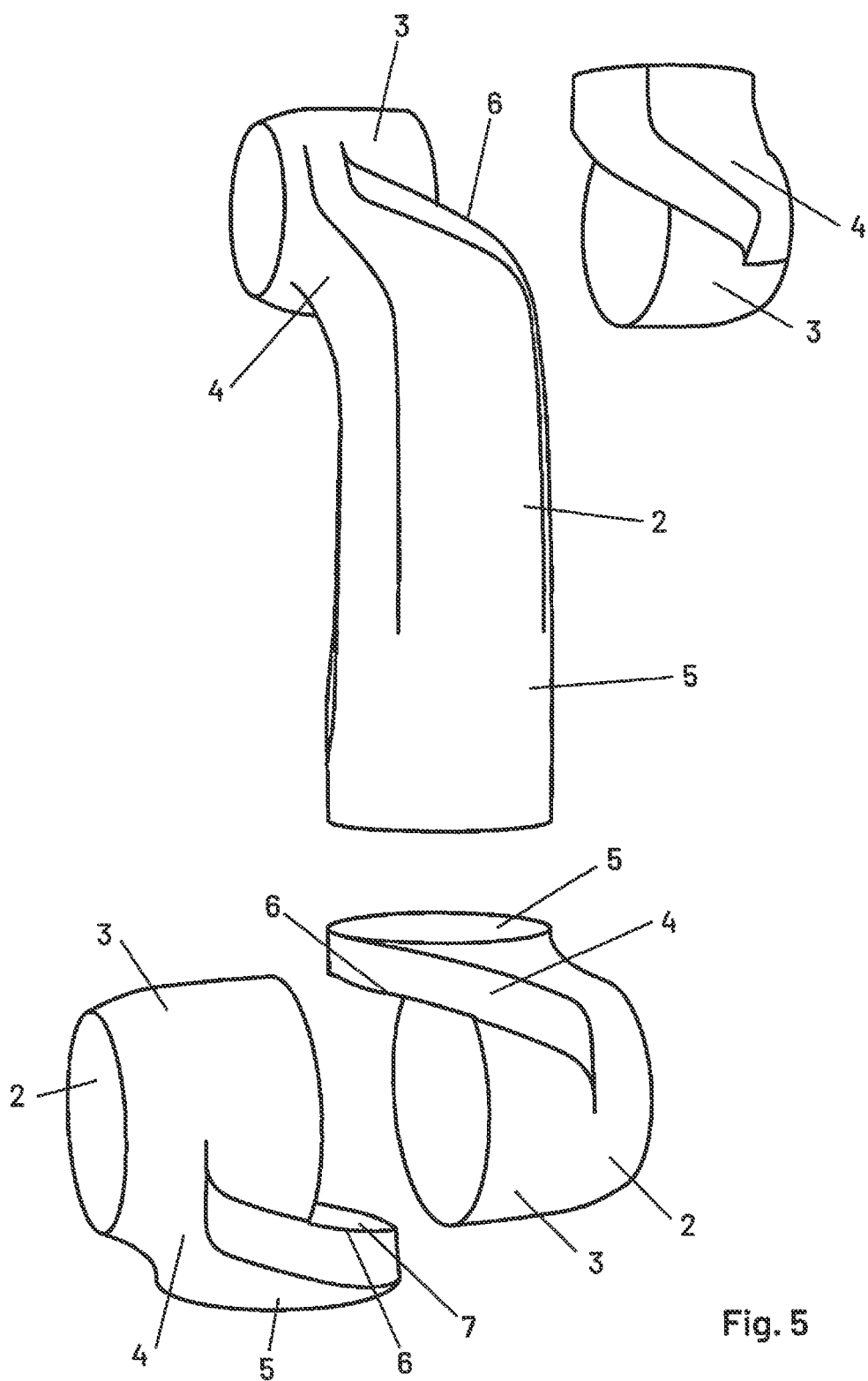
FIG. 5 shows an exploded view of a plurality of limbs of the robot arm of FIG. 1.

FIG. 5 shows an exploded view of a plurality of limbs in the region of the shoulder joint 12 and the elbow joint 13 of the robot arm 1 of FIG. 1. In particular, the structure of the individual limbs 2 and their position within the robot arm can be clearly seen.

Figure 6:
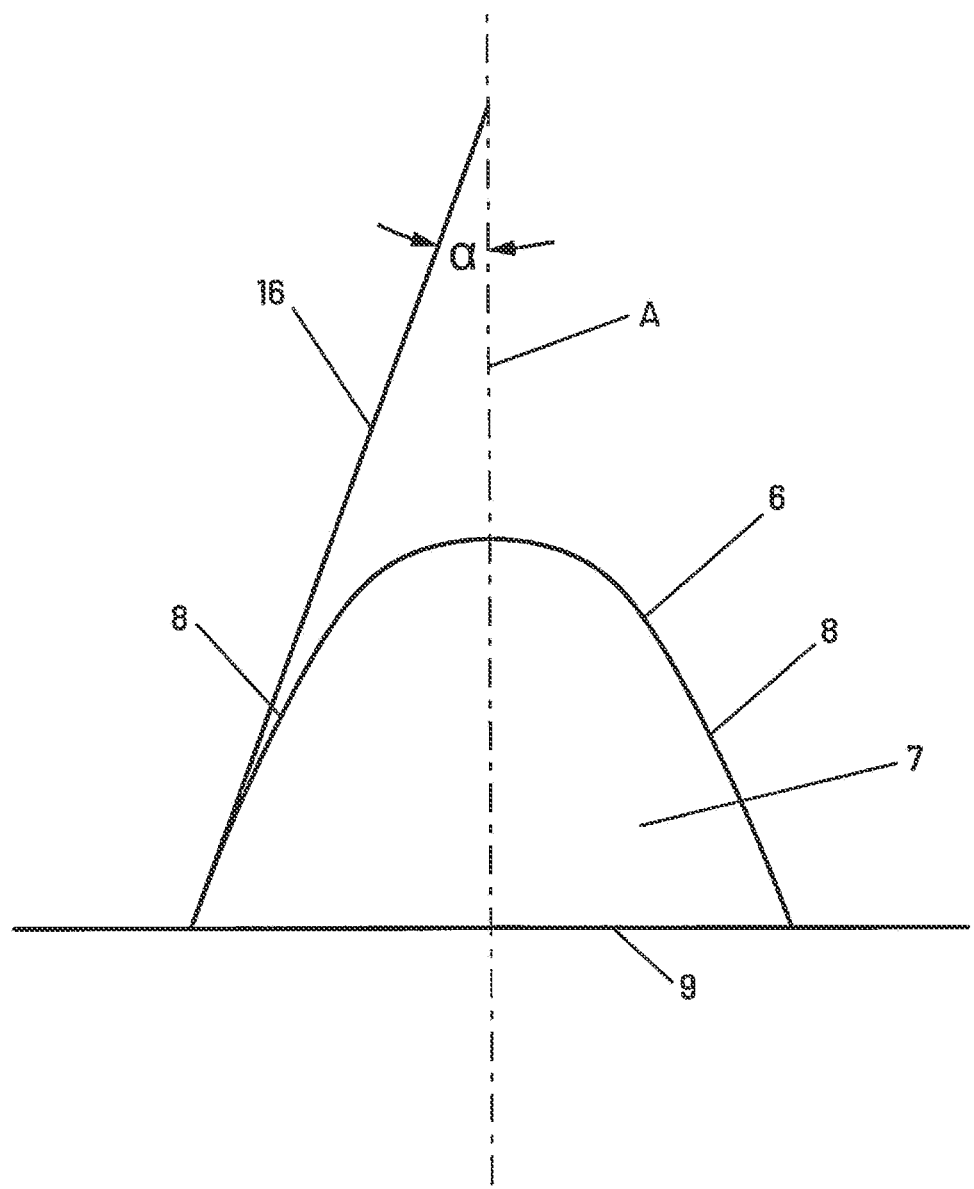
FIG. 6 shows a plan view of a bottom surface of the transition region of a limb.

FIG. 6 shows an example of the peripheral edge 6 of the bottom surface 7 of a limb 2 of the shoulder joint 12. The peripheral edges 6 of the other limbs 2 can be formed in the same way or in a similar way. As can be seen, when viewed from above, the peripheral edge 6 has a V-shaped or parabolic contour with two legs 8 which run obliquely with respect to the rotation axis A.

If a tangent 16 is placed on the peripheral edge 6 at the location of the parting line 9, the tangent 16 preferably assumes an angle α of between 0° and 30° with the rotation axis A. The legs 8 of the peripheral edge 6 thus run (viewed from above) in the region of the parting line at an angle between 0° and 30° relative to the rotation axis A. According to a preferred embodiment, the angle α can be about 15° to 25°.

The individual limbs 2 are preferably made of metal or plastic. The controller of the robot arm 1 can be integrated in the robot arm 1 or provided at an external location.

The invention claimed is:

1. A robot arm having at least a first limb and a second limb which are connected to one another at one of their ends via an articulated joint so that they can be pivoted relative to one another about a common rotation axis, wherein at least one of the limbs extends in a longitudinal direction and comprises a joint portion and a transition region adjoined thereto, which extends from a lower edge of the joint portion of the limb in the direction of the joint portion of the other limb to extend across a face of the joint portion when viewed from a direction extending transverse to the rotation axis and transverse to the longitudinal direction wherein the transition region of at least the first limb has a peripheral edge which, when viewed from a direction extending transverse to the rotation axis and transverse to the longitudinal direction, extends crosses a parting line disposed on the face of the joint portion present between the two joint portions;

the peripheral edge extending a distance of less than 25 mm outside a surface of the underlying joint portion of the second limb with respect to the rotation axis; and wherein a portion of the peripheral edge, when viewed from the direction extending transversely to the rotation axis and transversely to the longitudinal direction, extends obliquely across the face of the joint portion to the rotation axis at the position where the peripheral edge crosses the parting line.

2. The robot arm according to claim 1, wherein the peripheral edge, along its course, has a substantially constant radial distance from the surface of the second limb.

3. The robot arm according to claim 1, wherein the peripheral edge, when viewed from a direction transverse to the rotation axis and transverse to the longitudinal direction extends at least in the region of the parting line at an angle between 1° and 70° relative to the rotation axis.

4. The robot arm according to claim 1, wherein the peripheral edge defines a bottom surface that is V-shaped or parabolic when viewed in the direction of a rolling axis extending along the longitudinal direction, the bottom surface having two legs that extend obliquely with respect to the rotation axis.

5. The robot arm according to claim 4, wherein the legs of the peripheral edge extend at least in the region of the parting line at an angle between 10° and 30° relative to the rotation axis.

6. The robot arm according to claim 1, wherein the second limb also comprises a transition region which extends from its joint portion in the direction of the joint portion of the first limb, crosses the parting line present between the two joint portions and then extends at a predetermined distance radially above the joint portion of the first limb, wherein the transition region of the second limb has a peripheral edge which is arranged at a radial distance of less than 25 mm above the surface of the underlying joint portion of the first limb with respect to the rotation axis and, when viewed from a direction transverse to the rotation axis and transverse to the longitudinal direction, extends obliquely to the rotation axis.

7. The robot arm according to claim 6, wherein the first and second limbs in the region of an articulation joint have adjacent edges which extend substantially in parallel in a particular position of the robot arm.

8. The robot arm according to claim 1, wherein the transition regions of the first and second limbs are shaped in such a way that a distance between adjacent transition regions measured in the region of the peripheral edges in the peripheral direction with respect to the rotation axis increases with increasing distance from the rotation axis.

9. The robot arm according to claim 8, wherein the transition regions of the first and second limbs are shaped such that, in the region of adjacent peripheral edges, a V-shaped free space remains between the transition regions when the first and second limbs are angled to the maximum.

10. The robot arm according to claim 1, wherein the parting line present between the joint portion of the first limb and the joint portion of the second limb lies substantially in the middle between the two joint portions.

* * * * *